US010691192B2

(12) United States Patent
Van Wyk et al.

(10) Patent No.: US 10,691,192 B2
(45) Date of Patent: Jun. 23, 2020

(54) PROXY MECHANISM FOR COMMUNICATIONS TO ESTABLISH ROUTES IN NETWORKS

(71) Applicant: Itron Global SARL, Liberty Lake, WA (US)

(72) Inventors: Hartman Van Wyk, Montloius sur Loire (FR); Jerome Bartier, Edinburgh (GB); Fabrice Monier, Bry sur Marne (FR); Sylvain Trinquet, Issy les Moulineaux (FR); Laurent Van Dersteen, Plaisir (FR)

(73) Assignee: Itron Global SARL, Liberty Lake, WA (US)

( * ) Notice: Subject to any disclaimer, the term of this patent is extended or adjusted under 35 U.S.C. 154(b) by 364 days.

(21) Appl. No.: 15/638,126

(22) Filed: Jun. 29, 2017

(65) Prior Publication Data
US 2019/0004587 A1   Jan. 3, 2019

(51) Int. Cl.
G06F 1/3234    (2019.01)
H04W 40/20    (2009.01)
H04L 29/08    (2006.01)
G06F 1/32    (2019.01)
H04L 12/24    (2006.01)
(Continued)

(52) U.S. Cl.
CPC .......... G06F 1/3234 (2013.01); G06F 1/32 (2013.01); H04L 41/12 (2013.01); H04L 67/2823 (2013.01); H04W 40/20 (2013.01); H04W 88/182 (2013.01); H04W 52/02 (2013.01); H04W 88/005 (2013.01)

(58) Field of Classification Search
CPC ........ G06F 1/3234; G06F 1/32; H04W 40/20; H04W 88/182; H04W 52/02; H04W 88/005; H04L 67/2823; H04L 41/12
See application file for complete search history.

(56) References Cited

U.S. PATENT DOCUMENTS 5,394,556 A  *  2/1995  Oprescu ............... G06F 13/36
                                                  709/220
9,510,347 B2 * 11/2016  Thubert ............... H04W 40/22
(Continued)

OTHER PUBLICATIONS

Search Report and Written Opinion dated Sep. 27, 2018 for PCT Application No. PCT/US18/38795, 10 pages.

Primary Examiner — Brian T O Connor
(74) Attorney, Agent, or Firm — Lee & Hayes, P.C.

(57) ABSTRACT

Techniques for employing a Mains Powered Device as a proxy for communicating on behalf of a Battery Powered Device are described herein. In some examples, the Mains Powered Device may be a parent node to the Battery Powered Device in a network which operates using a Routing Protocol for Low-Power and Lossy Networks (RPL). The Mains Powered Device may detect and/or forward a Destination Advertisement Object (DAO) transmitted from the Battery Powered Device to a DODAG root of the network, and begin to perform subsequent transmission of DAOs on behalf of the Battery Powered Device. In this way, the Mains Powered Device updates a routing table of the DODAG root periodically to include an indication of the Battery Powered Device as existing in the network, while extending the battery life of the Battery Powered Device by transmitting DAOs on behalf of the Battery Powered Device.

20 Claims, 8 Drawing Sheets

(51) Int. Cl.
  *H04W 88/18*   (2009.01)
  *H04W 52/02*   (2009.01)
  *H04W 88/00*   (2009.01)

(56) References Cited

U.S. PATENT DOCUMENTS

| | | | |
|---|---|---|---|
| 9,736,771 B2* | 8/2017 | Guo | H04W 52/0203 |
| 10,039,046 B2* | 7/2018 | Hui | H04L 41/5022 |
| 10,277,476 B2* | 4/2019 | Mermoud | H04L 41/5025 |
| 2012/0254338 A1* | 10/2012 | Agarwal | H04W 40/246 |
| | | | 709/208 |
| 2016/0019663 A1* | 1/2016 | Mani | G06Q 50/06 |
| | | | 700/291 |
| 2016/0020997 A1 | 1/2016 | Hui et al. | |
| 2016/0021525 A1* | 1/2016 | Mani | H04W 8/005 |
| | | | 455/434 |
| 2016/0021613 A1* | 1/2016 | Mani | H04W 52/0209 |
| | | | 370/311 |
| 2016/0134161 A1* | 5/2016 | Hui | H04L 45/28 |
| | | | 307/66 |
| 2016/0142248 A1 | 5/2016 | Thubert et al. | |
| 2016/0212698 A1* | 7/2016 | Guo | H04W 52/0203 |
| 2017/0048853 A1* | 2/2017 | Thubert | H04W 40/22 |
| 2017/0207967 A1* | 7/2017 | Thubert | H04L 12/44 |
| 2018/0331940 A1* | 11/2018 | Jadhav | H04L 45/121 |
| 2019/0166045 A1* | 5/2019 | Peng | H04L 45/507 |

* cited by examiner

US 10,691,192 B2

PROXY MECHANISM FOR COMMUNICATIONS TO ESTABLISH ROUTES IN NETWORKS

BACKGROUND

Communication networks, such as wireless mesh networks, star networks, and so on, are used to connect a variety of different devices. These communication networks often contain devices having different characteristics and capabilities. For instance, these networks may include "smart" utility meters such as electric, water and gas meters that are connected devices capable of reporting resource consumption readings over a communication network. While some meters, such as electric meters, are powered by alternating current electricity service ("mains power") from the electricity grid, other devices, such as many water and gas meters, are battery powered. In many cases, such battery powered devices are expected to operate for extended periods of time (twenty years or more) without being recharged.

Communication networks are generally governed by open industry standards which define guidelines, or protocols, that specify how network devices communicate. For example, network devices may be required to periodically transmit and/or receive certain types of data. While the communication requirements specified in these protocols may not pose a burden for mains powered devices that operate without power constraints, the amount of power required to communicate per these protocol guidelines results in battery life reduction in battery powered devices. Although low power networks standards and protocols have been implemented to address battery life reduction issues, there remains a need to enable battery powered devices to increase their communication ability for differing protocols without sacrificing battery life.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
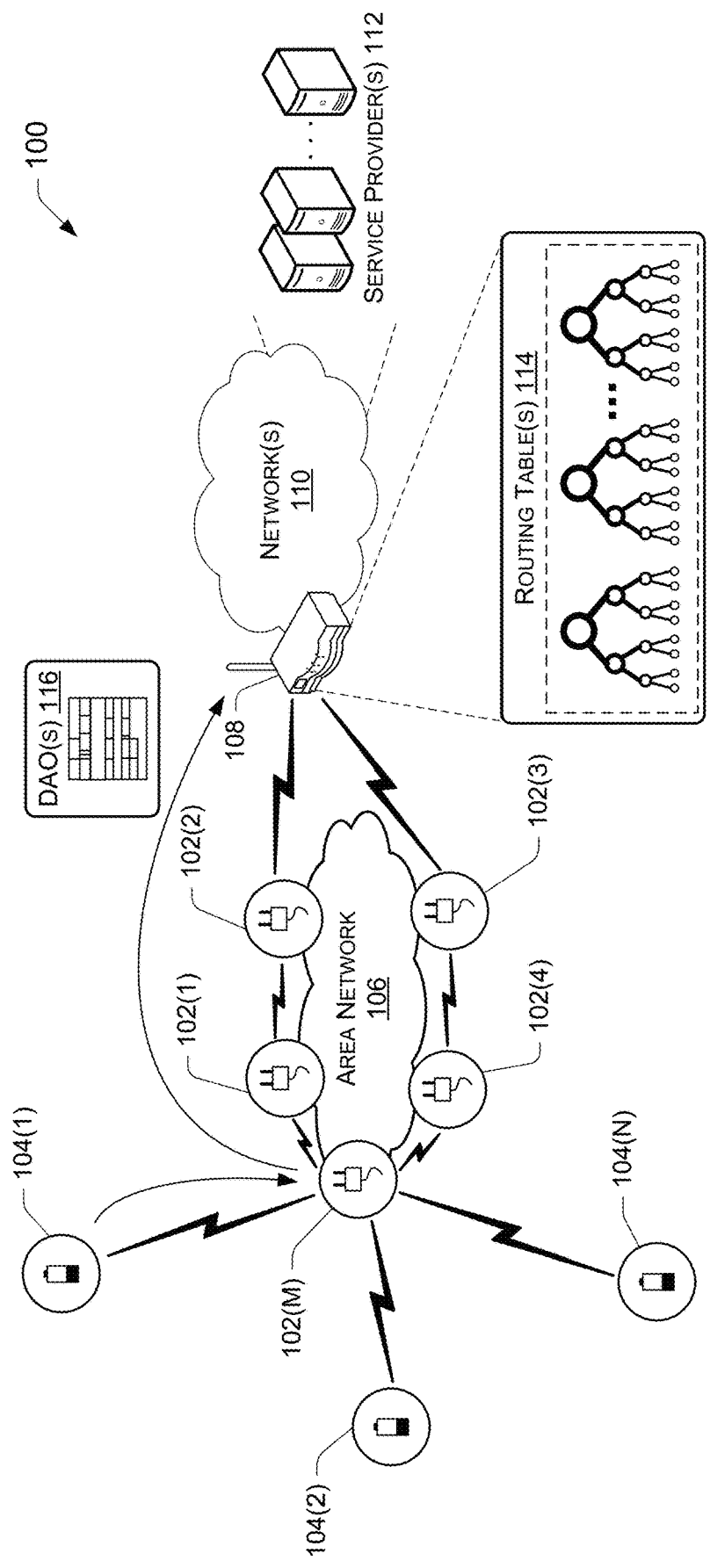
FIG. 1 is a schematic diagram of an example network architecture.

As discussed above, communication networks may be governed by standards or protocols which specify communication requirements for network devices. While these communication requirements (e.g., transmission of data) may not be burdensome for mains powered devices that operate without power constraints, battery powered devices may experience reduction in battery life by performing these communication requirements. Reductions in battery life may be unacceptable for battery powered devices which are expected to operate for extended periods of time without being recharged.

This disclosure describes techniques directed to employing a mains powered device as a proxy for communicating on behalf of battery powered devices. In some examples, the mains powered devices may be parent nodes for one or more battery powered devices in communication networks. In some examples, the mains powered devices may transmit and/or receive data over a communication network on behalf of the battery powered devices. The mains powered devices may generate data, such as messages, to transmit on behalf of the battery powered devices such that it appears to other communication devices on the communication network that the battery powered devices are transmitting the messages themselves. In some examples, by employing a mains powered device to communicate on behalf of battery powered devices, battery powered devices may conserve battery power and extend battery life by not having to transmit data according to a network standard or protocol, and/or by not having to exit a low power mode into a normal power mode to receive data from other network devices on the communication network.

Various network standards and protocols have been implemented for different types of networks. Numerous standards alliances, groups, or organizations (e.g., Internet Protocol for Smart Objects (IPSO) Alliance, Institute for Electrical and Electronic Engineers (IEEE), Internet Engineering Task Force (IETF), Wi-SUN Alliance, etc.) have been organized to develop and promote voluntary network standards and protocols, such as Internet standards and protocols. As noted above, standards have been developed for low power networks, such as low-power and lossy networks (LLNs), which are a class of network in which the network devices operate under various constraints (e.g., constraints on processing power, memory, battery power, etc.).

Network protocols have been implemented for LLNs, such as the IPv6 Routing Protocol for Low-Power and Lossy Networks (RPL). Like many protocols, RPL has various communication requirements by which network devices must abide. For example, nodes in LLNs may store routing tables which may comprise indications of downward routes and/or upward routes. In some examples, root nodes in an LLN (e.g., Destination-Oriented Directed Acyclic Graph (DODAG) root) may store a routing table which indicates downward routes for the LLNs. The root nodes may be configured to periodically refresh their routing tables. The root nodes may further be configured to remove a node from its routing table (e.g., tree-like routing structure) if the root nodes have not received messages from the node for a period of time, and consider the node removed from the network. Thus, the RPL may specify that nodes in an LLN must periodically send messages to the root nodes to refresh the root node's routing table.

In some examples, the RPL may specify a type of message used to refresh the routing tables of the root nodes in LLNs. For instance, each node in an LLN may be required to periodically send a Destination Advertisement Object (DAO) to the root nodes to propagate the destination information upward along the LLN. Nodes may be required to send a DAO in various instances, such as when there is a change in a parent node, when the node is introduced to the network, and/or periodically to refresh the root nodes' routing tables and construct downward routes towards the node in the LLN. Among other types of data, the DAO may include an Internet Protocol (IP) address (e.g., IPv6 address) which is used to indicate the IP address at which the node is reachable. However, as noted above, periodic transmission of the DAO may reduce battery life for battery powered devices on the network.

In various examples, the techniques described herein are directed to a mains powered device generating and sending a DAO on behalf of a battery powered device. In some instances, the mains powered device may be a parent node for the battery powered device. When a battery powered device is introduced to an LLN which operates using the RPL, the battery powered device may send an initial DAO message to a root node (e.g., DODAG root). Additionally, the battery powered device may relay other data to a root node, such as resource consumption data, to be communicated to a central office system or another remote service provider. The mains powered device may determine an IP address of the battery powered device based on information contained in the DAO, or other data, sent from the battery powered device. For instance, the mains powered device may be a parent node for the battery powered device, and the battery powered device may transmit the DAO, or other data, using a one-hop form of transmission from node to node over the network using various communication means (e.g., power line communications, radio frequency communications, etc.).

In some examples, the mains powered device may initially determine that the battery powered device is powered using a battery, and subsequent to the initial DAO message, begin to periodically transmit a DAO on behalf of the battery powered device. For instance, once a threshold amount of time has passed from the battery powered device transmitting the initial DAO, the mains powered device may begin to transmit a DAO on behalf of the battery powered device at scheduled intervals. In some instances, the intervals at which the mains powered device transmits a DAO on behalf of the battery powered device may be based on a schedule by which the root node clears or refreshes the stored routing table. In some examples, the mains powered device may generate the DAO and populate the DAO with information to mimic a DAO that would be transmitted by the battery powered device. In this way, the battery powered device may conserve energy by avoiding periodic transmissions of a DAO to a root node, but maintain the benefit of having a routing table of a root node, and/or other network nodes, refreshed to include the battery powered device in the stored downward routes.

In various examples, the mains powered device may receive a new packet from a battery powered device, such as a new packet of metrology data to be transmitted upstream in the network by the mains powered device. Upon receiving the new packet, the mains powered device may determine whether a proxy DAO has been send to the root in over a threshold period of time. If a proxy DAO has not been sent to the root node in over the threshold period of time, the mains powered device may generate a proxy DAO and send it to the root node shortly after receiving the new packet from the battery powered device to refresh the routing table of the root node.

While the examples described herein are with reference to a routing protocol for low-power and lossy networks, the techniques may be similarly applied for any type of communication standard, protocol, and network. In some examples, the techniques may be implemented in the context of an advanced metering infrastructure (AMI) of a utility communication network. However, the techniques described herein are not limited to use in a utility industry AMI. For example, the techniques may be implemented in the context of Distribution Automation, Home Energy Management, or any other type of wireless or wired network. Unless specifically described to the contrary, the techniques described herein are applicable to any communications network, control network, and/or another type of network or system. In one example, the techniques may be implemented in the context of the Internet of Things (IoT).

By way of example and not limitation, network communication devices (sometimes referred to as nodes, computing devices, or just devices) include utility meters (e.g., electricity, water, or gas meters), relays, repeaters, routers, transformers, sensors, switches, encoder/receiver/transmitters (ERTs), appliances, personal computers (e.g., desktop computers, laptop computers, etc.), mobile devices (e.g., smartphones, tablets, personal digital assistants (PDAs), electronic reader devices, etc.), wearable computers (e.g., smart watches, optical head-mounted displays (OHMDs), etc.), servers, access points, portable navigation devices, portable gaming devices, portable media players, televisions, set-top boxes, computer systems in an automobile (e.g., navigation systems), cameras, robots, hologram systems, security systems, home-based computer systems (e.g., intercom systems, home media systems, etc.), projectors, automated teller machines (ATMs), and so on. In some instances, a network communication device may comprise a battery powered network communication device (also referred to as a "battery powered device") that relies on a battery for power (i.e., is not connected to mains power). In other instances, a network communication device (also referred to as a "mains powered device") may comprise a mains powered device that relies on mains power for electricity.

Example Environment

FIG. 1 is a diagram illustrating an example networked environment or architecture 100. The architecture 100 includes multiple network communication devices. The network communication devices include mains powered devices (MPD) 102(1), 102(2), 102(3), 102(4), . . . 102(M) (collectively referred to as "MPDs 102"), and battery powered devices (BPDs) 104(1), 104(2), . . . 104(N) (collectively referred to as "BPDs 104"), where M and N are any integers greater than or equal to 1 and may be the same number or different numbers. In some illustrations, the MPDs 102 include more functionality/resources than the BPDs 104. In one example, the MPDs 102 are connected to mains electricity (e.g., electricity meters), while the BPDs 104 are not connected to mains electricity (e.g., water meters, gas meters, etc. that employ batteries). In other examples, the MPDs 102 and BPDs 104 may have different processing power, processing capabilities, and so on. The techniques discussed herein may be implemented to communicate between MPDs 102, BPDs 104, or any combination of devices.

The network communication devices are in communication with one another via an area network (AN) 106. As used herein, the term "area network" refers to a defined group of devices that are in communication with one another via one or more wired or wireless links. Examples of area networks include, for example, local area networks (LANs), neighborhood area networks (NANs), personal area networks (PANs), home area networks (HANs), Field Area Networks (FANs), or the like. While only one AN 106 is shown in FIG. 1, in practice, multiple ANs may exist and may collectively define a larger network, such as an advanced metering infrastructure (AMI) of a utility communication network. At any given time, each individual device may be a member of a particular AN. Over time, however, devices may migrate from one AN to another geographically proximate or overlapping AN based on a variety of factors, such as respective loads on the ANs, battery reserves, interference, or the like.

The term "link" refers to a direct communication path between two devices (without passing through or being relayed by another device). A link may be over a wired or wireless communication path. Each link may represent a plurality of channels over which a device is able to transmit or receive data. Each of the plurality of channels may be defined by a frequency range which is the same or different for each of the plurality of channels. In some instances, the plurality of channels comprises radio frequency (RF) channels. The AN 106 may implement a channel hopping sequence, such that a channel may change over time. Although many examples discussed herein implement a plurality of channels as data channels, in some instances the plurality of channels include a control channel that is designated for communicating messages to specify a data channel to be utilized to transfer data. Transmissions on the control channel may be shorter relative to transmissions on the data channels.

The AN 106 may comprise a mesh network, in which the network communication devices relay data through the AN 106. Alternatively, or additionally, the area network 106 may comprise a star network, in which a central device acts as a parent to one or more children devices. For example, the MPD 102(M) may act as a parent to the BPDs 104(1), 104(2), and 104(N). Further, in some instances the AN 106 may include a portion that is implemented as a mesh network and a portion that is implemented as a star network. Moreover, in other instances the AN 106 may be implemented in whole or part by other types of networks, such as hub-and-spoke networks, mobile networks, cellular networks, etc. In some instances, a device may be able to communicate with multiple different types of networks (e.g., a mesh network and a star network) at the same or different times. For instance, if a device is unable to discover a suitable device in a mesh network mode, the device may attempt to connect to a nearby star network, mobile data collection network, or cellular network. Regardless of the topology of the AN 106, individual network communication devices may communicate by wireless (e.g., radio frequency) and/or wired (e.g., power line communication, Ethernet, serial, etc.) connections.

In many examples, the BPDs 104 are implemented as leaf nodes. A leaf node may generally communicate with a parent node and not relay data for another node. As illustrated in FIG. 1, the BPDs 104(1) and 104(2) act as leaf nodes, with the MPD 102(M) being the parent node. Further, any type of device may be implemented as a leaf node (e.g., any of the MPDs 102).

The network communication devices also include an edge device 108, which serves as a connection point of the AN 106 to one or more networks 110 (e.g., a backhaul network), such as the Internet. The edge device 108 may include, but is not limited to, a field area router (FAR), a cellular relay, a cellular router, an edge router, a DODAG (Destination Oriented Directed Acyclic Graph) root, a root device or node of the AN 106, a combination of the foregoing, or the like. In this illustrated example, the edge device 108 comprises a DODAG root, which relays communions from the AN 106 to one or more service providers 112 via the network(s) 110. Thus, the edge device 108 will be referred to as DODAG root 108 moving forward, but may comprise any type of edge device depending on the network and network topology.

In some instances, the one or more service providers 112 comprise one or more central office systems that include a security service such as Authentication, Authorization and Accounting (AAA) server, a network registration service such as Dynamic Host Configuration Protocol (DHCP) server, a network management service (NMS), a collection engine (CE), a meter data management system (in the utility context), a customer relationship management system (in the sales context), a diagnostic system (in a manufacturing context), an inventory system (in a warehouse context), a patient record system (in the healthcare context), a billing system, etc. The network communication devices may register or interact with some or all of these one or more central office systems. In one example, the one or more central office systems may implement a meter data management system to collect resource consumption data from the network communication devices of the AN 106, process the resource consumption data, provide data regarding resource consumption to customers, utilities, and others, and/or perform a variety of other functionalities. In other instances, the one or more service providers 112 comprise other systems to implement other functionality, such as web services, cloud services, and so on. In yet other instances, the one or more service providers 112 may be implemented as other types of devices, such as in the context of the Internet of Things (IoT) that allows a variety of devices to exchange data.

The one or more service providers 112 may be physically located in a single central location, or may be distributed at multiple different locations. The one or more service providers 112 may be hosted privately by an entity administering all or part of the communications network (e.g., a utility company, a governmental body, distributor, a retailer, manufacturer, etc.), or may be hosted in a cloud environment, or a combination of privately hosted and cloud hosted services.

In many instances, a BPD 104 may connect to a network by connecting directly with an MPD 102. To illustrate, a battery powered water meter, for example, the BPD 104(1), discovers in its vicinity an electricity meter, the MPD 102(M), connected to mains power. Because the MPD 102(M) is connected to mains power, it has no practical energy constraints. The BPD 104(1) may associate the MPD 102(M) as its parent, in which case the MPD 102(M) acts as the connecting point between the BPD 104(1) and the one or more service providers 112.

In some examples, the AN 106 may comprise an LLN (low-power and lossy network) which operates using the routing protocol for low-power and lossy networks (RPL). In some examples, the AN 106 may run multiple instances of the RPL, where each instance has one or more DODAG roots 108. LLNs generally comprise a directed acyclic graph (DAG) which may be a multi-tree directed graph in which there is one directed path between two nodes. In a DAG, all edges may be oriented such that no cycles exist and are contained in paths terminating at one or more root nodes. The DODAG root 108 is a DAG root which acts as a border router for the LLN and aggregates routes in the LLN.

As shown in FIG. 1, a BPD 104 may send an initial DAO 116 to the DODAG root 108, such as when the BDP 104 is initially introduced into the AN 106, or when the BPD 104 is introduced to a new parent node (e.g., MPD 102). In some examples, the BPD 104(1) may first send the DAO 116 to an MPD 102(M), which in turn forwards the DAO 116 up the AN to the DODAG root 108. In some instances, the DODAG root 108 may store one or more routing tables 114, which may be organized as a tree-like structure as illustrated. However, the routing tables 114 may store data in any format (e.g., tables, graphs, etc.). The DAO 116 (e.g., message) may comprise one or more packets of data and be used by the DODAG root 108 to update its routing tables 114 and establish downward routes from the DODAG root 108 for transmission of data and path determination. In examples where an RPL instance operating on the AN 106 is in a "storing mode," the nodes of the AN 106 may each store indications of the various routes, such as those stored in the routing tables 114, which are in turn used to transmit data using one-hop, or next-hop, transmission techniques between neighboring nodes. In various examples, once the BPD 104 has sent an initial DAO 116, it may be configured to refrain from sending subsequent DAOs 116 unless the BPD 104 is introduced to a new parent node. The parent node for the BPD 104(2), such as MPD 102(M), may be configured to detect the initial DAO 116 sent from the BPD 104(2), and perform subsequent transmission of DAO 116 messages on behalf of the BPD 104(2). In some examples, any type of data or packet sent from the BPD 104(2) and detected by the MPD 102(M) may cause the MPD 102(M) to perform a subsequent transmission of DAO 116. For instance, the MPD 102(M) may detect a packet of metrology data sent from the BPD 104(2), determine whether a DAO 116 has been sent on behalf of the BPD 104(2) for a threshold period of time, and send the DAO 116 if no DAO 116 has been sent for the threshold period of time. As described more fully below, the MPD 102(M) may generate a DAO 116 which has fields populated to mimic a DAO 116 that would be transmitted by the BPD 104(2), and periodically transmit the DAOs 116 to the DODAG root 108 to keep the routing tables 114 populated with a stored indication of the BPD 104(2) as being included in the AN 106.

Example Network Communications Devices

Figure 2:
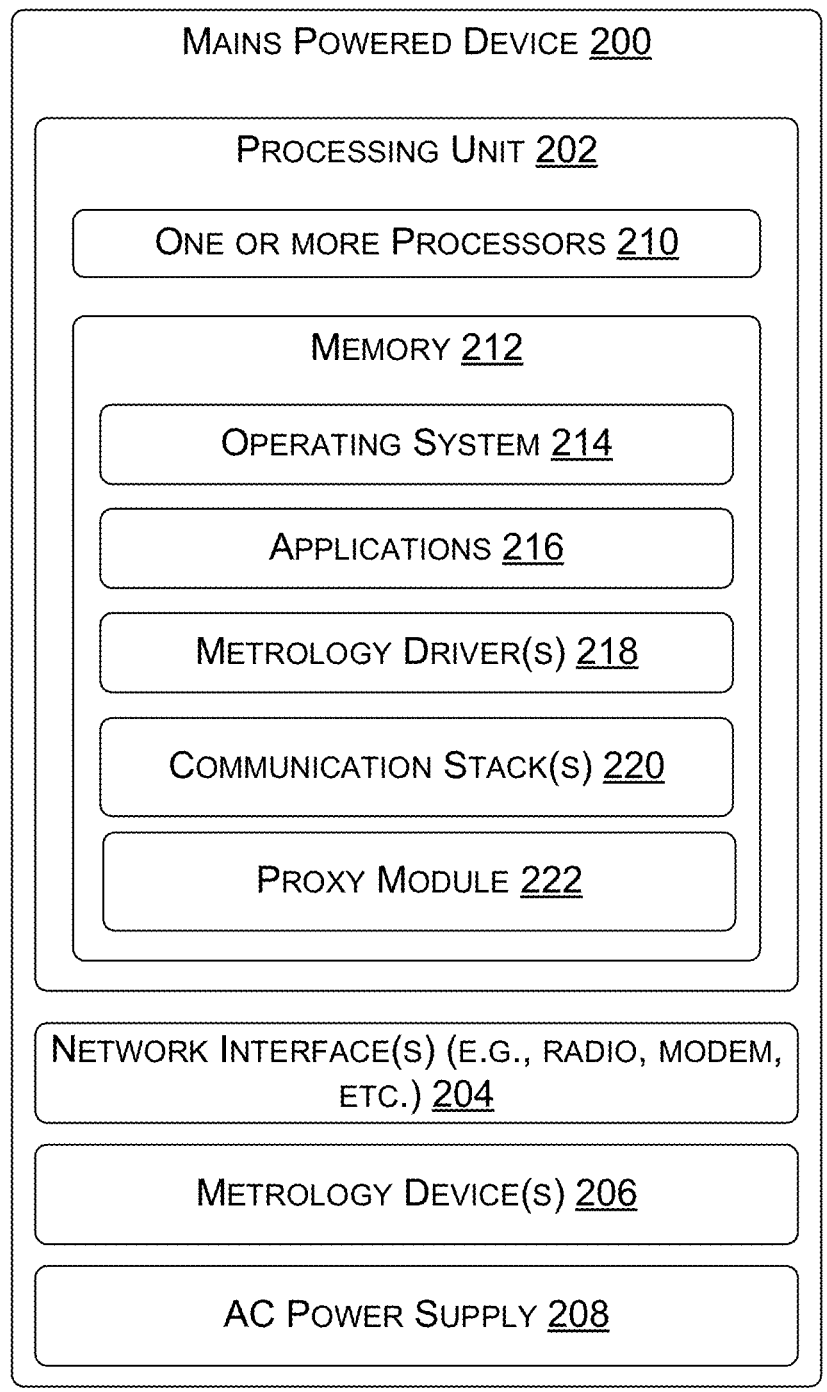
FIG. 2 is a diagram showing details of an example Mains Powered Device.

FIG. 2 is a diagram showing details of an example Mains Powered Device 200 (MPD). In this example, MPD 200 comprises a device that is connected to mains power, such as an electricity meter, sensor, etc. As discussed above, MPDs can take numerous different forms, depending on the industry and context in which they are deployed. Different types of MPDs may have different physical and/or logical components. For instance, utility meter MPDs such as that shown in FIG. 2 may have metrology components, whereas other types of MPDs may not.

As shown in FIG. 2, the example MPD 200 includes a processing unit 202, one or more network interfaces 204 (e.g., transceiver, power line communication module, etc.), one or more metrology devices 206, and an alternating current (AC) power supply 208 that couples to the AC mains power line wherein the MPD 200 is installed. The processing unit 202 may include one or more processors 210 and memory 212. When present, the one or more processors 210 may comprise microprocessors, central processing units, graphics processing units, or other processors usable to execute program instructions to implement the functionality described herein. Additionally, or alternatively, in some examples, some or all of the functions described may be performed in hardware, such as an application specific integrated circuit (ASIC), a gate array, or another hardware-based logic device.

The network interface(s) 204 may include a transceiver comprised of one or more hardware and/or software implemented radios to provide two-way RF communication with other network communication devices in the AN 106 and/or other computing devices via the network 110. The transceiver may additionally or alternatively include a modem to provide power line communication (PLC) communication with other network communication devices that are connected to an electrical service grid.

The metrology device(s) 206 comprise the physical hardware and sensors to measure consumption data of a resource (e.g., electricity, water, or gas) at a site of the meter. In the case of an electric meter, for example, the metrology device(s) 206 may include one or more Hall effect sensors, shunts, or the like. In the case of water and gas meters, the metrology device(s) 206 may comprise various flow meters, pressure sensors, or the like. The metrology device(s) 206 may report the consumption data to the one or more service providers 112 via the network interfaces 204. The consumption data may be formatted and/or packetized in a manner or protocol for transmission.

The memory 212 includes an operating system (OS) 214 and one or more applications 216 that are executable by the one or more processors 210. The memory 212 may also include one or more metrology drivers 218 configured to receive, interpret, and/or otherwise process the metrology data collected by the metrology device(s) 206. Additionally, or alternatively, one or more of the applications 216 may be configured to receive and/or act on data collected by the metrology device(s) 206.

The memory 212 may also include one or more communication stacks 220. In some examples, the communication stack(s) 220 may be configured to implement a 6LowPAN protocol, an 802.15.4e (TDMA CSM/CA) protocol, an 802.15.4-2015 protocol, an IPv6 Routing Protocol for Low-Power and Lossy Networks (RPL), and/or another protocol. However, in other examples, other protocols may be used, depending on the networks with which the device is intended to be compatible. The communication stack(s) 220 describe the functionality and rules governing how the MPD 200 interacts with each of the specified types of networks. For instance, the communication stack(s) 220 may cause MPDs and BPDs to operate in ways that minimize the battery consumption of BPDs when they are connected to these types of networks.

In some instances, the MPD 200 may be configured to send or receive communications on multiple channels simultaneously. For example, the network interfaces 204 may be configured to receive data at the same time on hundreds of channels. Additionally, or alternatively, the network interface(s) 204 may be configured to send data at the same time on hundreds of channels.

In some examples, the communication stack(s) 220 may cause the MPDs to perform various communications using an RPL. For example, the communication stack(s) 220 may be configured to communicate according to guidelines defined by the RPL. In some examples, the MPD 200 may further include a proxy module 222 which configures the MPD 200 to perform various operations on behalf of other devices, such as BPDs 104. For example, the proxy module 222 may be configured to detect and/or forward an initial DAO transmitted by a BPD 104. Subsequent to detecting the initial DAO transmitted by the BPD 104, the proxy module 222 may cause the MPD 200 to generate and transmit DAOs on behalf of the BPD 104 to maintain an indication of the BPD 104 and/or a downward path for the BPD 104 in the routing table 114 of the DODAG root 108.

In some examples, the detection of the initial DAO transmitted by the BPD 104 may begin a timer by the proxy module 222. The proxy module 222 may be configured with a delay (e.g., 5 seconds, 30 seconds, 1 minute, 5 minutes, 60 minutes (1 hour), 360 minutes (6 hours), 720 minutes (12 hours), etc.) from the detection of the initial DAO until the proxy module 222 generates and transmits a subsequent DAO on behalf of the BPD 104. Similarly, the MPD 200 may be configured with a delay (e.g., 5 seconds, 30 seconds, 1 minute, 5 minutes, 60 minutes (1 hour), 360 minutes (6 hours), 720 minutes (12 hours), etc.) between each DAO message generated and transmitted on behalf of the BPD 104 to refresh the routing table 114 of the DODAG root 108. In various examples, the proxy module 222 and/or the communication stacks 220 may be configured to generate and transmit a DAO on behalf of the BPD 104 such that other nodes in the AN 106 that observe the DAOs cannot determine that the MPD 200 transmitted the DAO on behalf of the BPD 104.

Figure 3:
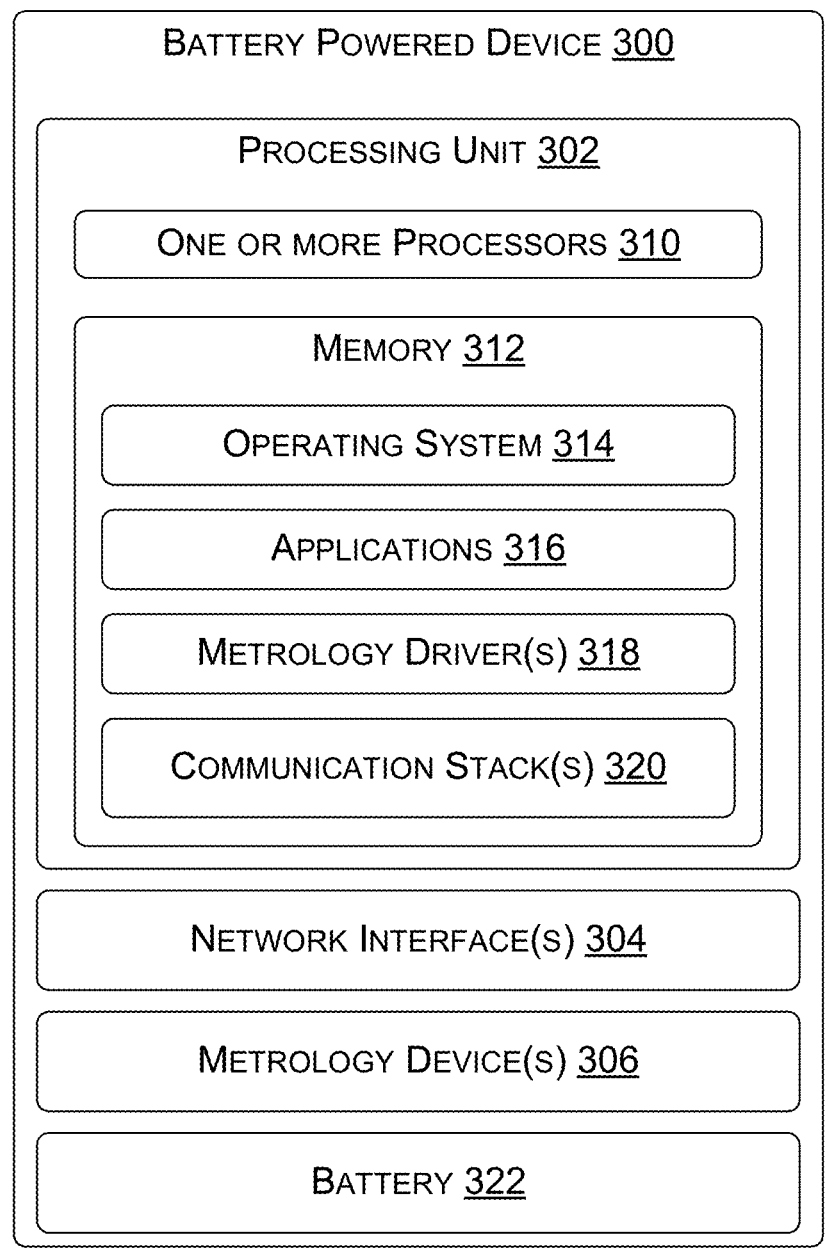
FIG. 3 is a diagram showing details of an example Battery Powered Device.

FIG. 3 is a diagram showing details of an example Battery Powered Device 300 (BPD). In this example, BPD 300 comprises a device that is not connected to mains power. However, as discussed above, BPDs can take numerous different forms, depending on the industry and context in which they are deployed. Different types of BPDs may have different physical and/or logical components. For instance, utility meter BPDs such as that shown in FIG. 3 may have metrology components, whereas other types of BPDs may not.

The BPD 300 of FIG. 3 is similar in many respects to the MPD 200. To the extent that the MPD 200 and BPD 300 include the same or similar components, the functions will not be repeated here. Therefore, the following discussion of the BPD 300 focuses on the differences between the BPD 300 and the MPD 200. However, the differences highlighted below should not be considered to be exhaustive. One difference between the MPD 200 and the BPD 300 is that the BPD 300 may include a battery 322 instead of the AC power supply 208. The specific characteristics of the battery 322 may vary widely depending on the type of BPD 300. By way of example and not limitation, the battery 322 may comprise a Lithium Thionyl Chloride battery (e.g., a 3-volt battery having an internal impedance rated at 130 Ohms), a Lithium Manganese battery (e.g., a 3-volt battery having an internal impedance rated at 15 Ohms), a Lithium Ion battery, a lead-acid battery, an alkaline battery, and so on.

Also, in some examples, even components with similar functions may be different for MPDs than for BPDs due to the different constraints. As one example, while both MPDs and BPDs have network interfaces 304 including transceivers, the specific transceivers used may be different. For instance, an MPD transceiver may include a PLC modem while a BPD transceiver does not because the BPD is not connected to an electrical power line that could be used for PLC communications. Additionally, or alternatively, an BPD transceiver may employ a lower power RF radio to minimize energy consumption. Further, other components of MPDs and BPDs may vary. In some instances, BPDs are implemented with less functionality and/or include less hardware components than the MPDs. Further, in some instances components of BPDs are lower power components than the corresponding components of the MPDs.

The memory 212 of the MPD 200 and the memory 312 of the BPD 300 are shown to include software functionality configured as one or more "modules." However, the modules are intended to represent example divisions of the software for purposes of discussion, and are not intended to represent any type of requirement or required method, manner, or necessary organization. Accordingly, while various "modules" are discussed, their functionality and/or similar functionality could be arranged differently (e.g., combined into a fewer number of modules, broken into a larger number of modules, etc.).

In some examples, the communication stacks 320 may configure the BPD 300 to communicate using various protocols, such as RPL. In some examples, the communication stacks 320 may generate a DAO and cause the BPD 300 to transmit the DAO to a DODAG root 108. In some instances, the communication stacks 320 may generate an initial DAO upon being introduced to AN 106, introduced to a new parent node, or upon retry transmissions of an initial DAO. In some examples, the DAO may include a request for an acknowledgement DAO for the DODAG root 108 to transmit back to the BPD 300 upon receipt of the initial DAO. In some examples. after generating and transmitting an initial DAO, the communication stacks 320 may refrain from generating and transmitting subsequent DAOs to preserve battery life in the battery 322. Generally, the communication stacks 320 may configure the BPD to communicate with other devices on the AN 106 using various standards and protocols, including RPL.

The various memories described herein are examples of computer-readable media. Computer-readable media may take the form of volatile memory, such as random access memory (RAM) and/or non-volatile memory, such as read only memory (ROM) or flash RAM. Computer-readable media devices include volatile and non-volatile, removable, and non-removable media implemented in any method or technology for storage of information such as computer-readable instructions, data structures, program modules, or other data for execution by one or more processors of a computing device. Examples of computer-readable media include, but are not limited to, phase change memory (PRAM), static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transitory medium that can be used to store information for access by a computing device. As defined herein, computer-readable media does not include transitory media, such as modulated data signals and carrier waves, and/or signals.

While detailed examples of certain computing devices (e.g., the MPD 200 and the BPD 300) are described herein, it should be understood that those computing devices may include other components and/or be arranged differently. As noted above, in some instances a computing device may include one or more processors and memory storing processor executable instructions to implement the functionalities they are described as performing. Certain computing devices may additionally or alternatively include one or more hardware components (e.g., application specific integrated circuits, field programmable gate arrays, systems on a chip, and the like) to implement some or all of the functionalities they are described as performing.

By way of example and not limitation, the MPD 200 and/or the BPD 300 may implement a variety of modulation techniques and/or data rates, such as frequency-shift keying (FSK) 802.15.4g (e.g., mandatory mode with a data rate of 50 kbps or 75 kbps, no forward error correction; legacy mode with a data rate of 150 kbps with forward error correction code rate ½; option 2; etc.), offset quadrature phase-shift keying (OQPSK) modulation with direct-sequence spread spectrum (DSSS) spreading, and so on. To implement these different connection modes, a media access control (MAC) sub-layer of a device may be able to indicate to a physical layer the modulation technique and data rate to be used for each transmission.

In many instances, information that is included in an information element may be stored in the memory 212 of the MPD 200 and/or the memory 312 of the BPD 300. For example, the memory 212 and/or memory 312 may store any information regarding an operating context, such as schedule data, channel data, seed data, timing data, and so on. In some instances, components of the MPD 200 and/or the BPD 300 may reference the information to determine how to communicate according to a specific operating context.

Example Message

Figure 4:
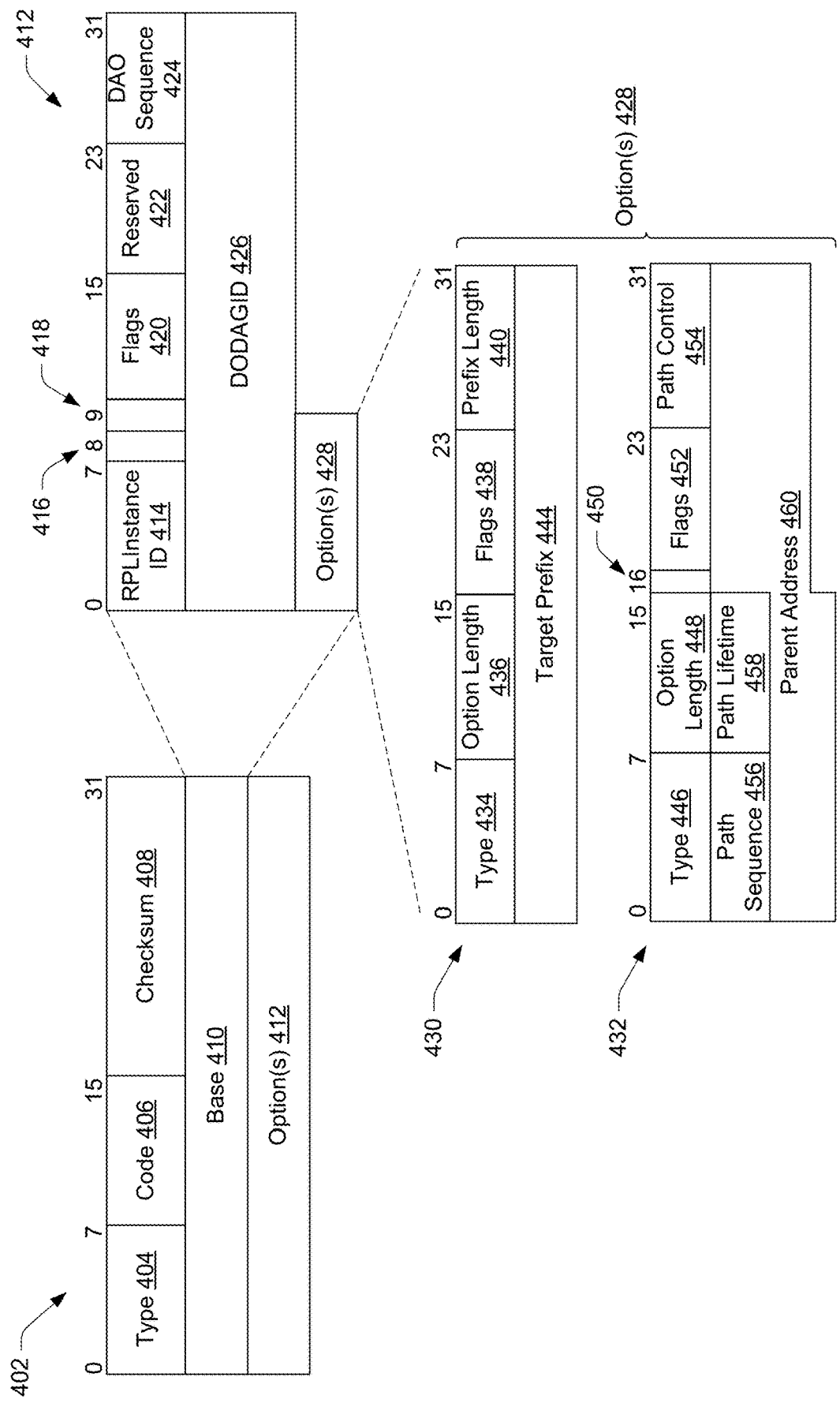
FIG. 4 is a schematic diagram of an example message generated by a Mains Powered Device and/or a Battery Powered Device.

FIG. 4 is a schematic diagram of an example message (e.g., DAO 416) generated by the MPD 200 and/or the BPD 300. FIG. 4 includes a control message 402, which includes various fields such as type 402, code 406, checksum 408, base 410, and option(s) 412. The control message 402 depicts a general structure used for various types of messages in the RPL routing protocol. Depending on the base 410, the control message may comprise any type of control message, such as DODAG Information Solicitation, DODAG Information Objects (DIOs), Destination Advertisement Objects (DAOs), Destination Advertisement Object Acknowledgement (DAO-ACK), Consistency Check (CC), etc. Although specific field sizes are shown in the schematic diagram of the example message of FIG. 4, these are merely illustrative examples of the types of fields and sizes of fields that may be included in the control message 402.

The type 404 field may be an 8-bit field populated with a code indicating that the message is a control message 402, and the type may be "155" for a control message 402. The code 406 field may be a 9-bit field which identifies the type of RPL control message (e.g., "0x01" for DIO, "0x02" for DAO, etc.). The checksum 408 may be a 16-bit field which includes a complement of the complement sum of the entire control message 402. The base 410 of the control message 402 is composed of data based on the type of control message (e.g., DIO, DAO, etc.) as defined by the code 406 field.

As shown in FIG. 4, the control message 402 has a base 410 of a DAO 412. As described above, the DAO 412 is used to propagate destination information upward along the network to the DODAG root 108. In storing mode, a DAO is unicast by a node (e.g., BPD 300) to the selected parent (e.g., MPD 200), and in non-storing mode, the DAO message is unicast to the DODAG root 108. The DAO 412 may include an 8-bit RPLInstanceID 414 field which indicates the topology instance associated with the DODAG, which is learned from DIO messages transmitted over the DODAG. The 'K' flag 416 is a single bit that, when populated, indicates that the node sending the DAO (e.g., MPD 200, BPD 300, etc.) is requesting an DAO acknowledgment (DAO-ACK) back from the recipient of the DAO (e.g. DODAG root 108). The 'D' flag 418 is a single bit that, when populated, indicates that the DODAGID field 426 is present or populated. The flags 420 field comprises 6 bits which are reserved for various flags, and the reserved field 422 is an 8-bit unused field that is initialized to zero. The DAO sequence field 424 is incremented at each DAO message from a node, and is also incremented in any DAO-ACK message. The DODAGID 426 comprises a 128-bit unsigned integer set by a DODAG root that uniquely identifies a DODAG, and is only presented when the 'D' flag 418 is populated. The DODAGID field 426 is used to identify a DODAGID that is associated with the RPLInstanceID 414. Finally, the options field 428 may allow for the DAO message to carry various options, such as the RPL Target option 430 and a Transit Information option 432.

In some examples, the RPL Target option 430 may be used to indicate a target IP address that is reachable or queried along the DODAG. Thus, the RPL Target option 430 indicates reachability with a target IP address. The option type field 434 for a DAO may be "0x05" as noted above, and the option length may be variable and indicate the length of the option. The flags field 438 may be an 8-bit unused field reserved for flags. The prefix length 440 may be an 8-bit unsigned integer, and may comprise a number of valid leading bits in the IP prefix. The target prefix field 444 may comprise a variable-length field identifying an IP destination address (e.g., BPD 300) and are the bits remaining after the bits included in the prefix length field 440.

In some examples, the option field 428 of the DAO 412 may include the Transit Information option 432. The Transit Information option 432 may be used for a node to indicate attributes for a path to one or more destinations, where the destinations are indicated by the Target options field 430 that precedes the Transit Information option 432. For instance, the Transit Information option 432 may be used for a node to indicate its DODAG parents to an upstream node (e.g., DODAG root 108 in non-storing mode) that is collecting DODAG routing information, such as for use to construct source routes. Similar to the RPL Target option 430, the Transit Information option 432 may include a type field 446 of "0x06", and an option length field 448. The Transit Information option 432 may include a 1-bit 'E' flag 450 to indicate that the parent router redistributes external targets into the RPL network. Additionally, the Transit Information option 432 may include a flags field 452, and a path control field 454 which limits the number of DAO parents to which a DAO message advertising connectivity to a specific destination may be sent. A path sequence field 456 is incremented each time an RPL Target option 430 is issued with updated information. The path lifetime field 458 is an 8-bit unsigned integer which indicates the length of time in lifetime units that the prefix is valid for route determination. The parent address subfield 460 may include the IP address of the DODAG parent of the node originally issuing the Transit Information option 432. In the storing mode of operation for an RPL instance, the DODAG parent address subfield 460 is not needed as the DAO message is sent directly to the parent.

Example Processes

Figure 5:
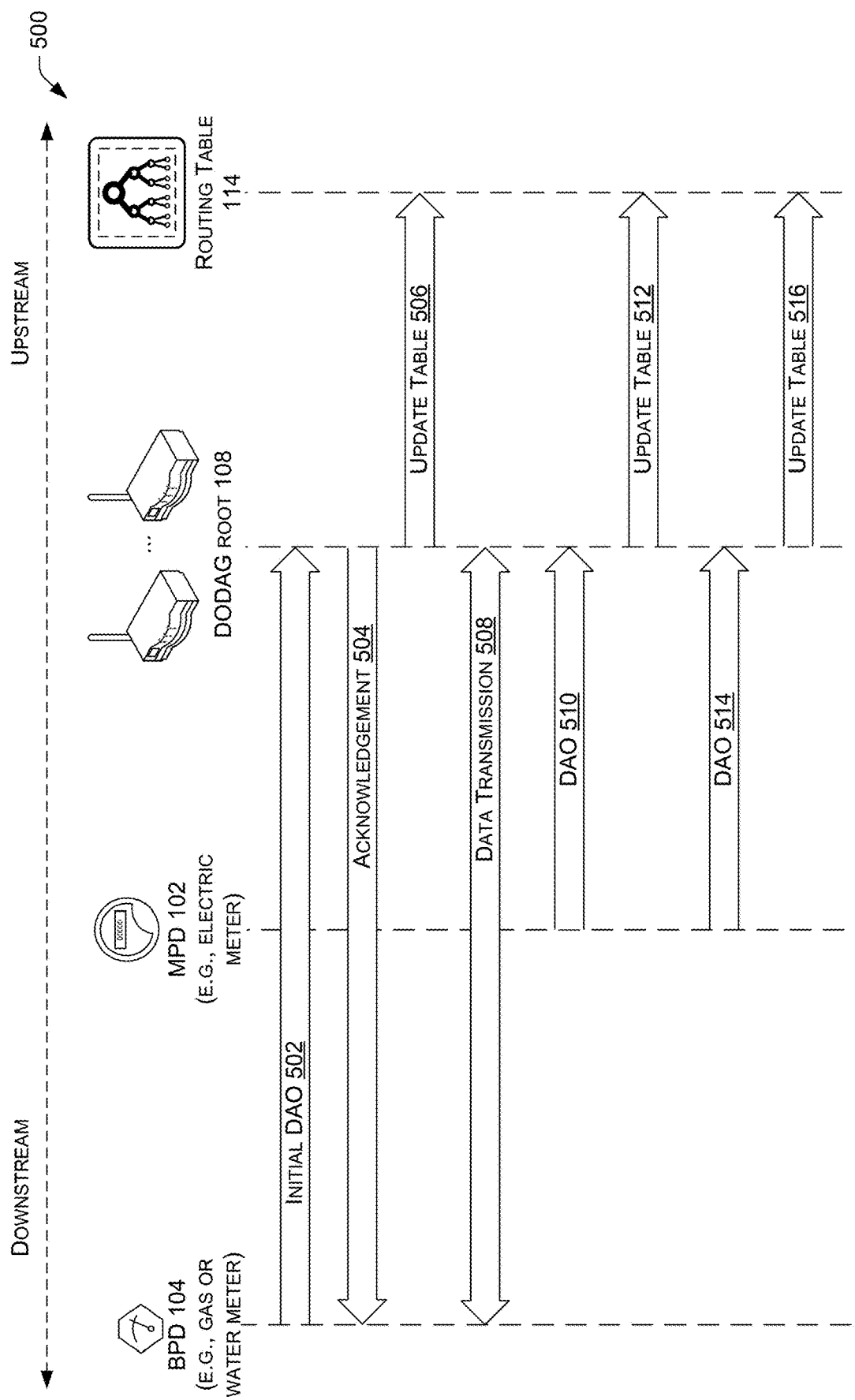
FIG. 5 is a signal flow diagram which illustrates an example process for a Mains Powered Device acting as a proxy by communicating on behalf of a Battery Powered Device.

FIG. 5 is a signal flow diagram which illustrates an example process 500 for a Mains Powered Device 102 (e.g., MPD 200) acting as a proxy by communicating on behalf of a Battery Powered Device 104 (e.g., BPD 300). In the process 500, the BPD 104 sends or transmits an initial DAO 502 to the DODAG root 108. In some examples, the initial DAO may be sent when the BPD 104 is introduced into the AN 106, when the BPD 104 is introduced to a new parent node, or for another reason. The initial DAO message may include an indication of the IP address of the BPD 104 for the DODAG root 108 to use in updating its routing table 114. In this way, the BPD 104 may propagate its destination information upward along the DODAG to create downward routes in the AN 106.

At 504, the DODAG root 108 may send an acknowledgement message to the BPD 104. In various examples, the initial DAO sent in 502 may include a flag (e.g., 'k' flag field 416) indicating that the BPD 104 is requesting an acknowledgement message from the DODAG root 108 indicating that the DODAG root 108 received the initial DAO. In some examples, if the BPD 104 does not receive the acknowledgement message, it may send one or more retry DAO messages to the DODAG root 108. When the BPD 104 receives the acknowledge message at 504, it may be configured to stop sending any DAOs moving forward and allow the MPD 102 to send the DAOs on behalf of the BPD 104.

At 506, the DODAG root 108 may update the routing table 114. For instance, the DODAG root 108 may refresh a network tree structure of the routing table 114 based on the IP address of the BPD 104 included in the initial DAO sent at 502. While illustrated as being separate from the DODAG root 108, in some examples, the routing table 114 is stored in the DODAG root 108.

At 508, one or more data transmissions may occur between the DODAG root 108 and the BPD 104. For instance, the DODAG root 108 may send data through a downward route indicated by the routing table 114 to the BPD 104. In some examples, the BPD 104 may send data upstream to the DODAG root 108, such as metrology data. In some examples, each node in the AN 106 may store an indication of the route(s) between the BPD 104 and the DODAG root 108 for performing next-hop transmission from neighbor node to neighbor node. In various examples when the BPD 104 sends data (e.g., metrology data) up the AN 106 to the DODAG root 108, these periodic data transmissions indicate to the MPD 102 that the BPD 104 is still connected to the network 106. For instance, the MPD 102 may forward the data on that is received from the BPD 104 to upstream nodes. This may indicate to the MPD 102 that the BPD 104 is still connected, and that the MPD 102 should continue to send DAOs on behalf of the BPD 104.

At 510, the MPD 102 may send a DAO to the DODAG root 108. The DAO may include an indication of the IP address of the BPD 104 to cause a downward route to be refreshed for the BPD 104. In some examples, the MPD 102 may be configured with delays to determine the periods of time to wait before sending a DAO. For instance, the MPD 102 may have determined that more than a threshold amount of time has passed since the BPD 104 sent the initial DAO. In some examples, the delay may comprise a time that precedes a point in time when the DODAG root 108 would remove the BPD 104 from the routing table 114. In various examples, the MPD 102 may receive the data transmission 508 to be forwarded up the network. In response to receiving the data transmission 508 from the BPD 102, the MPD 102 may determine that more than a threshold amount of time has passed since a previous DAO has been sent. Based on determining that more than a threshold amount of time has passed, the MPD 102 may send the DAO at 510.

At 512, the DODAG root 108 may update the routing table 114. For instance, the DODAG root 108 may refresh the routing table 114, where the routing table 114 maintains an indication of the BPD 104 as being in the AN 106, and an indication of a downward route to the BPD 104.

At 514, the MPD 102 may send a DAO to the DODAG root 108. The DAO may include an indication of the IP address of the BPD 104 to cause a downward route to be refreshed for the BPD 104. In some examples, the periodic DAO may be sent at 514 in response to an end of a threshold period of time (e.g., 12 hours) from when the periodic DAO was sent at 510. In various examples, the threshold period of time may comprise a time that precedes a point in time when the DODAG root 108 would remove the BPD 104 from the routing table 114.

In some examples, the MPD 102 may receive another data transmission to be forwarded up the network prior to sending the DAO 514. In response to receiving a data transmission from the BPD 102 prior (e.g., 1 second, 5 seconds, etc.) to sending the DAO 514, and the MPD 102 may determine that more than a threshold amount of time (e.g., 5 minutes, 1 hour, 6 hours, 12 hours, etc.) has passed since a previous DAO has been sent. Based on determining that more than a threshold amount of time has passed, the MPD 102 may send the DAO at 514.

At 516, the DODAG root 108 may update the routing table 114. For instance, the DODAG root 108 may refresh the routing table 114, where the routing table 114 maintains an indication of the BPD 104 as being in the AN 106, and an indication of a downward route to the BPD 104.

Figure 6A:
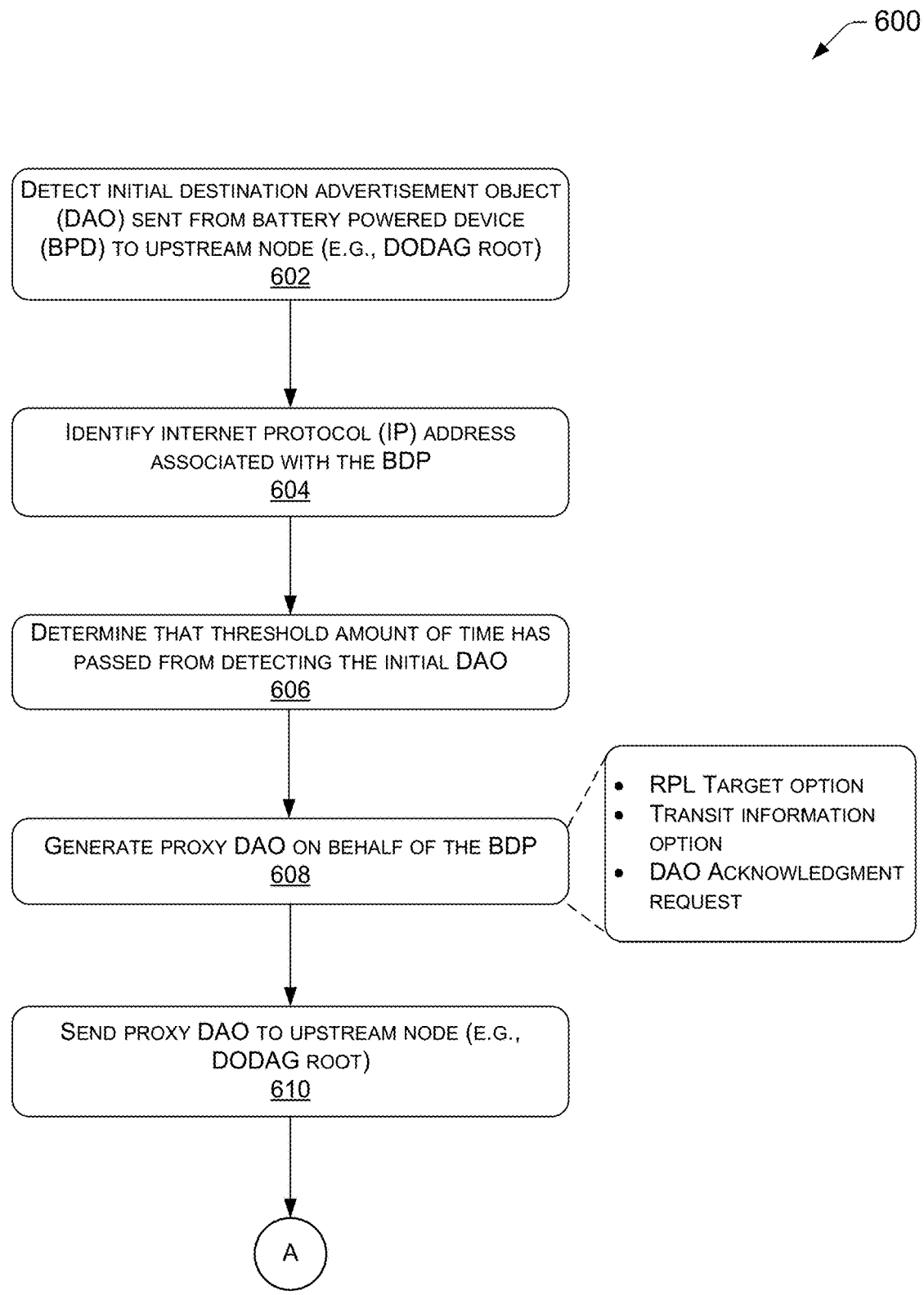
FIGS. 6A and 6B illustrate an example process for a Mains Powered Device acting as a proxy by communicating on behalf of a Battery Powered Device.
Figure 6B:
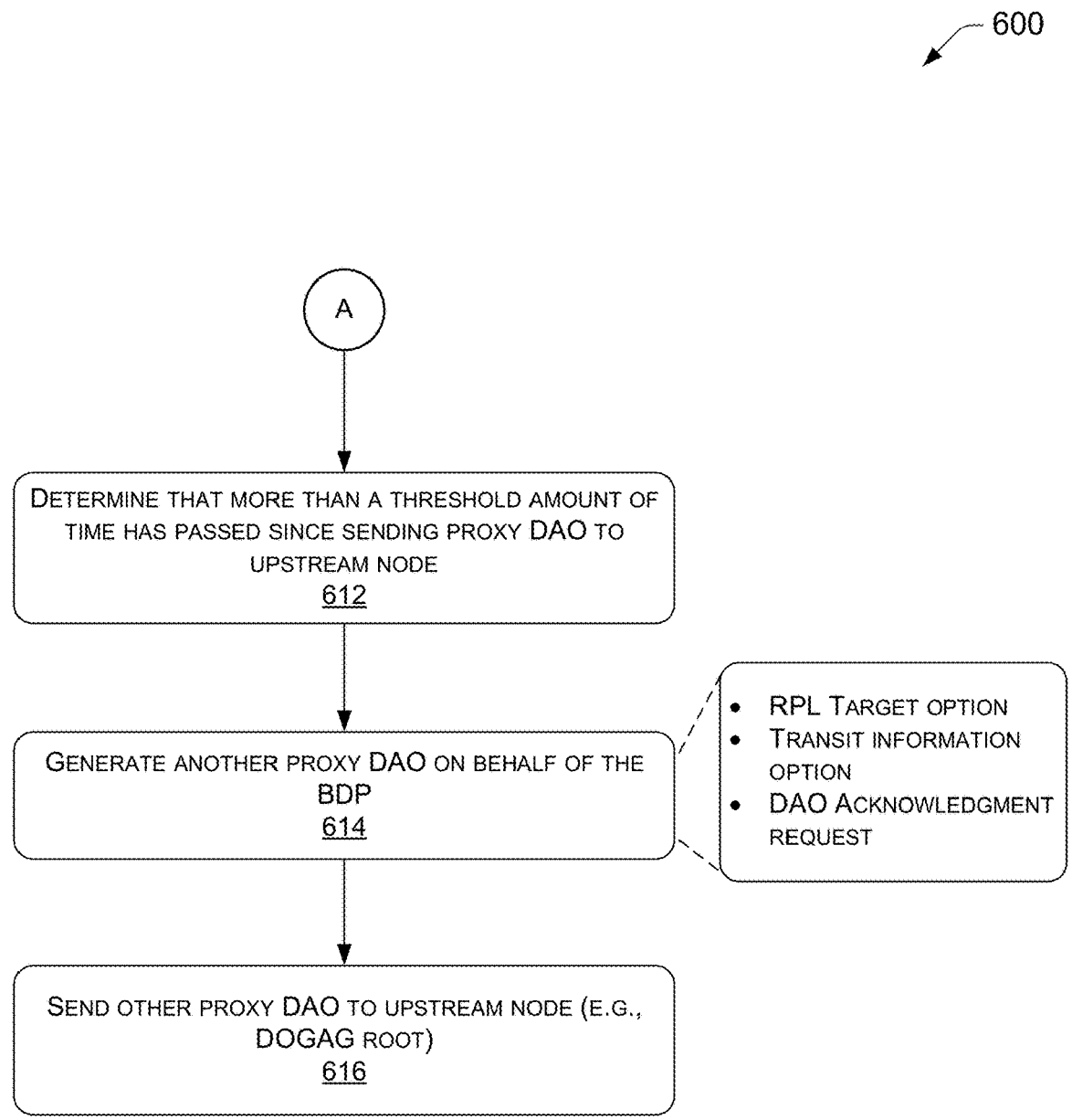
Figure 7:
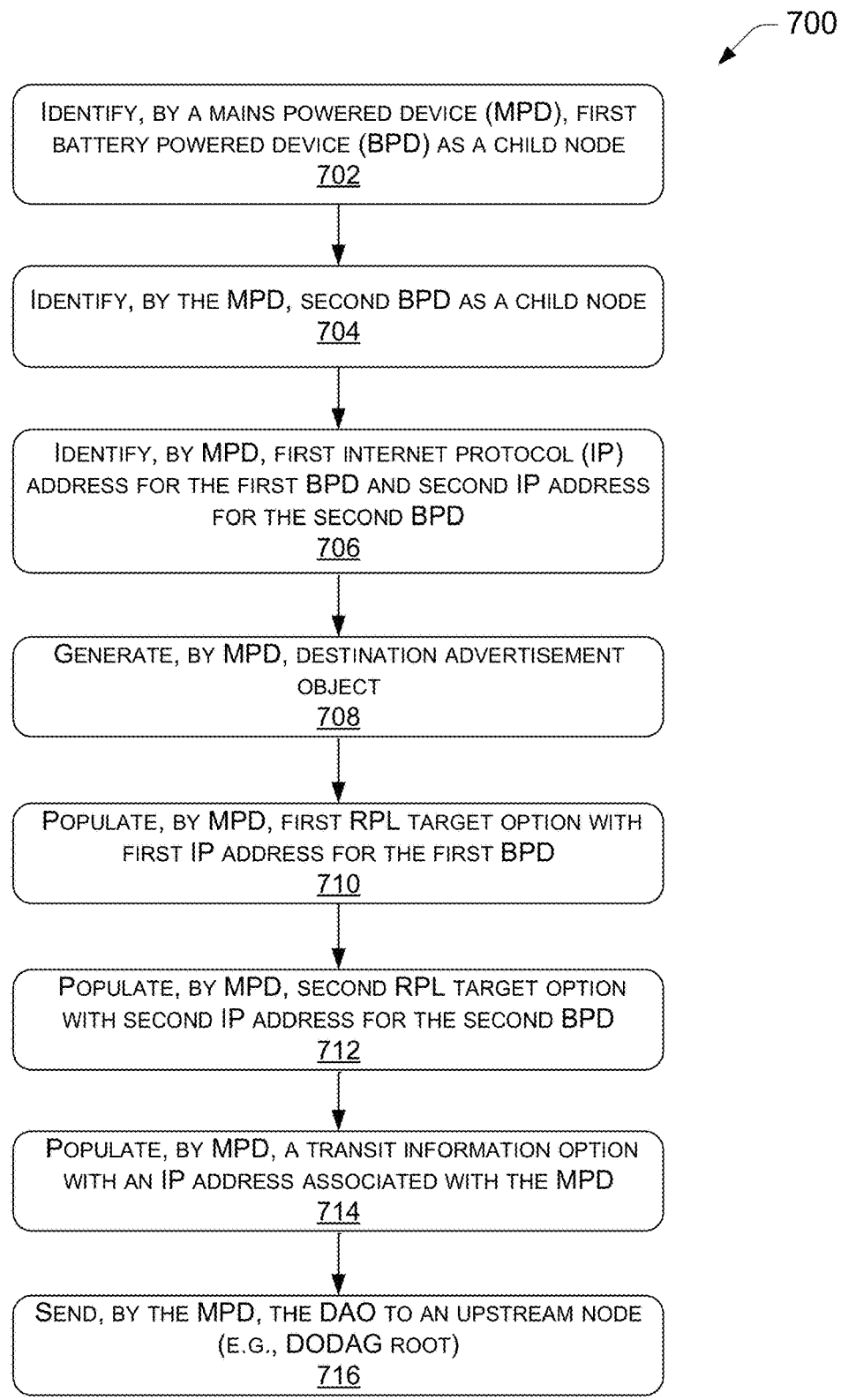
FIG. 7 illustrates an example process for a Mains Powered Device acting as a proxy by communicating on behalf of two Battery Powered Devices.

FIGS. 6A, 6B, and 7 illustrate example processes 600 and 700 for employing the techniques discussed herein. For ease of illustration the processes 600 and 700 may be described as being performed by a device described herein, such as the MPD 200 and/or the BPD 300. However, the processes 600 and 700 may be performed by other devices. Moreover, the devices may be used to perform other processes.

The processes 600 and 700 (as well as each process described herein) are illustrated as a logical flow graph, each operation of which represents a sequence of operations that can be implemented in hardware, software, or a combination thereof. In the context of software, the operations represent computer-readable instructions stored on one or more computer-readable storage media that, when executed by one or more processors, perform the recited operations. Generally, computer-readable instructions include routines, programs, objects, components, data structures, and the like that perform particular functions or implement particular abstract data types. In some contexts of hardware, the operations may be implemented (e.g., performed) in whole or in part by hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The order in which the operations are described is not intended to be construed as a limitation, and any number of the described operations can be combined in any order and/or in parallel to implement the process. Further, any number of the described operations may be omitted.

FIGS. 6A and 6B illustrate an example process 600 for a Mains Powered Device (MPD 200) acting as a proxy by communicating on behalf of a Battery Powered Device (BPD 300).

At 602, the MPD 200 may detect an initial destination advertisement object (DAO) sent from the BPD 300 to an upstream node, such as DODAG root 108. In some examples, the BPD 300 may send the initial DAO in response to being introduced to the AN 106, or being introduced to a new parent node (e.g., a new MPD 200).

At 604, the MPD 200 may identify an IP address associated with the BPD 300. In some instances, identifying the IPD address of the BPD may comprise analyzing a DODAG Information Object (DIO) of the BPD 300 which includes the IP address. In other examples, the IP address may be identified by receiving any type of message or data from the BDP 300 or another device in the network.

At 606, the MPD 200 may determine that a threshold amount of time (e.g., a pre-configured delay) has passed from detecting the initial DAO. In some examples, the threshold amount of time may comprise an amount of time that is less than an amount of time at which the DODAG root 108 refreshes the routing table 114.

In some examples, the MPD 200 may determine to transmit a DAO based on another factor. For example, the MPD 200 may receive a new packet from the BPD 300, such as a new packet of metrology data to be transmitted upstream in the network by the MPD 200. Upon receiving the new packet, the MPD 200 may determine whether a proxy DAO has been send to the root in over a threshold period of time. If a proxy DAO has not been sent to the root node in over the threshold period of time, the mains powered device may generate a proxy DAO and send it to the root node shortly after receiving the new packet (e.g., 1 second, 5 seconds, 1 minute, etc.) from the battery powered device to refresh the routing table of the root node.

At 608, the MPD 200 may generate a proxy DAO on behalf of the BDP 300. In some instances, the DAO may include an indication of the IP address of the BPD 300. For instance, the IP address of the BPD 300 may be included in an RPL target option of the DAO. Further, a transit information option of the DAO may include an IP address of the MPD 200. In some instances, the MPD 200 may further include a DAO acknowledgement request by populating the 'K' flag field 416.

At 610, the MPD 200 may send the proxy DAO to an upstream node. In some examples, the upstream node may comprise a neighbor of the MPD 200 which in turn forwards the DAO along an upward root to the DODAG root 108.

As shown in FIG. 6B, at 612, the MPD 200 may determine that more than a threshold amount of time has passed since sending the proxy DAO to the upstream node. In some examples, the threshold amount of time may comprise an amount of time that is less than an amount of time at which the DODAG root 108 refreshes the routing table 114.

In some examples, determining that more than the threshold amount of time has passed since sending the proxy DAO to the upstream node at 612 may be triggered by receiving a packet from the BPD 300 to be sent upstream in the network. For instance, the MPD 200 may receive a data packet from the BPD 300 to be sent up the network, and determine whether a proxy DAO has been sent in a threshold amount of time. If no proxy DAO has been sent in over the threshold amount of time, the MPD 300 may move to step 614.

At 614, based at least in part on determining that more than the threshold amount of time has passed since sending the proxy DAO, the MPD 200 may generate another proxy DAO on behalf of the BPD 300. The proxy DAO generated at 614 may generally include information similar to that of the proxy DAO generated at 608, such as an RPL target option, a transit information option, and/or a DAO acknowledgement request.

At 616, the MPD 200 may send the other proxy DAO generated at 614 to an upstream node. In some examples, the upstream node may comprise a neighbor node, which in turn forwards the other proxy DAO upstream according to an upward route. In some examples, the MPD 200 may send the other proxy DAO to the DODAG root 108.

FIG. 7 illustrates an example process 700 for an MPD 200 acting as a proxy by communicating on behalf of two BDPs 300.

At 702, the MPD 200 may identify a first battery powered device (BPD 300) as a child node. In some examples, the MPD 200 may receive an initial DAO from the first BPD 300 to be forwarded along an upward root to an upstream node, such as DODAG 108. In other examples, other types of data (e.g., utility consumption data) or messages (e.g., DIO messages) may be received by the MPD 200 to identify the first BPD 300 as a child node.

At 704, the MPD 200 may identify a second battery powered device (BPD 300) as a child node. In some examples, the MPD 200 may receive an initial DAO from the second BPD 300 to be forwarded along an upward root to an upstream node, such as DODAG 108. In other examples, other types of data (e.g., utility consumption data) or messages (e.g., DIO messages) may be received by the MPD 200 to identify the second BPD 300 as a child node.

At 706, the MPD 200 may identify a first IP address for the first BPD 300 and a second IP address for the second BPD 300. In some examples, the MPD 200 may identify the first and second IP addresses from various messages or data received at the MPD 200, such as a DAO, a DIO, or other data sent from the first and second BPDs 300.

At 708, the MPD 200 may generate a DAO. In some instances, the DAO may include various options having multiple fields. For instance, the DAO may include options for including multiple RPL Target options for indicating multiple IP addresses for multiple devices.

At 710, the MPD 200 may populate a first RPL target option with the first IP address for the first BPD 300. At 712, the MPD 200 may further populate a second RPL target option with the second IP address for the second BPD 300. At 714, the MPD 200 may even further populate a transit information option with an IP address associated with the MPD 200. Thus, the MPD 200 may generate a single DAO which includes the first IP address and the second IP address. In further examples, the single DAO may also include an IP address of the MPD 200. In this way, the MPD 200 may refresh the downward routes for the first BPD 300, second BPD 300, and/or the MPD 200 in a single DAO.

At 716, the MPD 200 may send the DAO to an upstream node, such as an immediate neighbor node along an upward route, or the DODAG root 108. In this way, the DODAG root 108 may refresh its routing table 114 to include downward routes for the first BPD 300, the second BPD 300, and/or the MPD 200.

CONCLUSION

Although the disclosure describes embodiments having specific structural features and/or methodological acts, it is to be understood that the claims are not necessarily limited to the specific features or acts described. Rather, the specific features and acts are merely illustrative some embodiments that fall within the scope of the claims of the disclosure.

What is claimed is:

1. A method of operating a mains powered device to communicate over a network on behalf of a battery powered device, the method comprising:

identifying, by the mains powered device, an internet protocol (IP) address associated with the battery powered device, wherein the mains powered device is a parent node for the battery powered device in the network;

generating, by the mains powered device, a destination advertisement object (DAO) message, wherein the DAO message designates the IP address associated with the battery powered device as a target; and causing, by the mains powered device, the DAO message to be sent to an upstream node in the network on behalf of the battery powered device, wherein the upstream node is upstream of the battery powered device and the mains powered device.

2. The method of claim 1, further comprising:
identifying, by the mains powered device, a time at which an initial DAO message was sent by the battery powered device to the upstream node;
determining, by the mains powered device, that a threshold amount of time has passed from the time at which the initial DAO message was sent; and
determining, by the mains powered device, to send the DAO message to the upstream node based at least in part on determining that the threshold amount of time has passed.

3. The method of claim 1, further comprising:
determining, by the mains powered device, that a threshold amount of time has passed from a time the DAO message was sent to the upstream node; and
causing, by the mains powered device, another DAO message to be sent to the upstream node based at least in part on determining that the threshold amount of time has passed from the time the DAO message was sent to the upstream node.

4. The method of claim 1, wherein generating the DAO message comprises designating an IP address of the mains powered device indicating the mains powered device as the parent node for the battery powered device.

5. The method of claim 1, wherein the DAO message includes a request for the upstream node to send an acknowledgement message indicating that the upstream node received the DAO message.

6. The method of claim 1, wherein:
the battery powered device comprises a first battery powered device and the IP address associated with the first battery powered device comprises a first battery powered device IP address;
the mains powered device is a parent node for a second battery powered device in the network, the second battery powered device associated with a second battery powered device IP address; and
generating the DAO message comprises:
designating, by a first target option of the DAO message, the first battery powered device IP address as a first target;
designating, by a second target option of the DAO message, the second battery powered device IP address as a second target; and
designating, by a transit information option of the DAO message, the mains powered device IP address as the parent node for the first battery powered device and the second battery powered device.

7. A mains powered device comprising:
one or more network communications interfaces to communicate on a network;
one or more processors communicatively coupled to the one or more network communications interfaces; and
memory communicatively coupled to the one or more processors, the memory storing one or more instructions that, when executed by the one or more processors, cause the one or more processors to perform operations comprising:
identifying an internet protocol (IP) address of a battery powered device in the network, wherein the battery powered device is a child node of the mains powered device;
generating a destination advertisement object (DAO), wherein the DAO includes the IP address of the battery powered device; and
sending the DAO to one or more upstream nodes in the network on behalf of the battery powered device, wherein the one or more upstream nodes are upstream from the battery powered device and the mains powered device.

8. The mains powered device of claim 7, the operations further comprising:
determining that the battery powered device is powered by a battery; and
based at least in part on determining that the battery powered device is powered by the battery, determining to generate the DAO and send the DAO.

9. The mains powered device of claim 7, the operations further comprising:
identifying a time at which an initial DAO was sent by the battery powered device to the one or more upstream nodes;
determining that a threshold amount of time has passed from the time at which the initial DAO was sent to the one or more upstream nodes; and
determining to send the DAO to the one or more upstream nodes based at least in part on determining that the threshold amount of time has passed.

10. The mains powered device of claim 7, the operations further comprising:
determining that a threshold amount of time has passed from a time the DAO was sent to the one or more upstream nodes; and
sending another DAO to the one or more upstream nodes based at least in part on determining that the threshold amount of time has passed from the time the DAO was sent to the upstream node.

11. The mains powered device of claim 10, the operations further comprising:
receiving data from the battery powered device;
forwarding the data to the one or more upstream nodes;
determining, based at least in part on receiving the data, that the battery powered device remains connected to the network; and
based at least in part on determining that the battery powered device remains connected to the network, determining to send the other DAO to the one or more upstream nodes after the threshold amount of time has passed.

12. The mains powered device of claim 7, the operations further comprising:
receiving a packet from the battery powered device;
in response to receiving the packet, determining an amount of time from when a previous DAO was sent to the one or more upstream nodes on behalf of the battery powered device;
determining that the amount of time is higher than a threshold amount of time; and
determining to generate the DAO and send the DAO based at least in part on determining that the amount of time is higher than the threshold amount of time.

13. The mains powered device of claim 7, wherein generating the DAO comprises populating a target prefix field of a target option of the DAO with the IP address of the battery powered device.

14. The mains powered device of claim 7, wherein generating the DAO comprises populating a parent address field of a transit information option of the DAO with an IP address of the mains powered device.

15. A node in a network comprising:
one or more processors; and
memory communicatively coupled to the one or more processors, the memory storing one or more instructions that, when executed by the one or more processors, cause the one or more processors to perform operations comprising:

identifying a first Internet Protocol (IP) address for a first battery powered device in the network, wherein the first battery powered device is a child node to the node;

identifying a second IP address for a second battery powered device in the network, wherein the second battery powered device is a child node to the node;

generating a destination advertisement object (DAO), wherein the DAO includes the first IP address and the second IP address; and sending the DAO to one or more upstream nodes in the network on behalf of the first battery powered device and the second battery powered device, wherein the one or more upstream nodes are upstream in the network to the first battery powered device, the second battery powered device, and the node.

16. The node of claim 15, wherein the DAO further includes a third IP address of the node.

17. The node of claim 15, wherein generating the DAO comprises:

populating a first target prefix field of a first target option of the DAO with the first IP address of the first battery powered device; and populating a second target prefix field of a second target option of the DAO with the second IP address of the second battery powered device.

18. The node of claim 15, the operations further comprising:

determining that a threshold amount of time has passed from a time the DAO message was sent to the one or more upstream nodes; and sending another DAO including the first IP address and the second IP address to the one or more upstream nodes based at least in part on determining that the threshold amount of time has passed from the time the DAO was sent to the one or more upstream nodes.

19. The node of claim 15, the operations further comprising:

identifying a time at which an initial DAO message was sent by one of the first battery powered device or the second battery powered device to the one or more upstream nodes;

determining that a threshold amount of time has passed from the time at which the initial DAO message was sent; and determining to send the DAO message to the one or more upstream nodes based at least in part on determining that the threshold amount of time has passed.

20. The node of claim 15, the operations further comprising:

determining that the first battery powered device and the second battery powered device are powered by batteries; and based at least in part on determining that the first battery powered device and the second battery powered device are powered by batteries, determining to generate the DAO, and send the DAO.

* * * * *